US012799371B2

(12) United States Patent
Narimatsu et al.

(10) Patent No.: US 12,799,371 B2
(45) Date of Patent: Nov. 17, 2026

(54) PRESSURE-SENSITIVE ADHESIVE TAPE AND PRODUCTION METHOD THEREFOR

(71) Applicant: Sekisui Chemical Co., Ltd., Osaka (JP)

(72) Inventors: Kiyoshirou Narimatsu, Hasuda (JP); Nobuto Kamiya, Hasuda (JP); Kensuke Tsumura, Hasuda (JP); Kenta Hayashi, Hasuda (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 57 days.

(21) Appl. No.: 18/289,860

(22) PCT Filed: May 11, 2022

(86) PCT No.: PCT/JP2022/019956
§ 371 (c)(1),
(2) Date: Nov. 7, 2023

(87) PCT Pub. No.: WO2022/239805
PCT Pub. Date: Nov. 17, 2022

(65) Prior Publication Data

US 2024/0240057 A1 Jul. 18, 2024

(30) Foreign Application Priority Data

May 12, 2021 (JP) ................................ 2021-081311

(51) Int. Cl.

| | |
|---|---|
| ***C09J 7/38*** | (2018.01) |
| ***B29C 48/00*** | (2019.01) |
| ***B29C 48/285*** | (2019.01) |
| ***B29K 7/00*** | (2006.01) |
| ***C09J 107/00*** | (2006.01) |

(52) U.S. Cl.
CPC ........... *C09J 7/383* (2018.01); *B29C 48/0021* (2019.02); *B29C 48/297* (2019.02); *C09J 107/00* (2013.01); *B29K 2007/00* (2013.01); *C09J 2301/302* (2020.08); *C09J 2400/283* (2013.01); *C09J 2407/00* (2013.01)

(58) Field of Classification Search
CPC .............. B29C 48/0021; B29C 48/297; B29K 2007/00; C09J 107/00; C09J 2203/326; C09J 2301/302; C09J 2400/283; C09J 2407/00; C09J 7/21; C09J 7/383
See application file for complete search history.

(56) References Cited

U.S. PATENT DOCUMENTS

| | | | | |
|---|---|---|---|---|
| 2014/0242377 | A1* | 8/2014 | Kopke | C09J 193/00 428/323 |
| 2017/0137246 | A1* | 5/2017 | Blömker | B65H 19/1826 |
| 2020/0095474 | A1 | 3/2020 | Watanabe et al. | |
| 2020/0339842 | A1 | 10/2020 | Watanabe et al. | |

FOREIGN PATENT DOCUMENTS

| | | |
|---|---|---|
| EP | 1 043 373 | 10/2000 |
| JP | 3-124786 | 5/1991 |
| JP | 7-278509 | 10/1995 |
| JP | 8-92264 | 4/1996 |
| JP | 2000-233473 | 8/2000 |
| JP | 2016-186015 | 10/2016 |
| JP | 2020-50711 | 4/2020 |
| JP | 2020-183452 | 11/2020 |

OTHER PUBLICATIONS

International Search Report (ISR) issued Aug. 2, 2022 in International (PCT) Application No. PCT/JP2022/019956.
Shintaro Kunisawa, "Examination of constant viscosity rubber", Journal of the Society of Rubber Science and Technology, Japan, pp. 260-263, https://doi.org/10.2324/gomu.41.260, 1968, cited in ISR.
Junkichi Yamada, "SMR Standard Revision-1979 (Changes in Natural Rubber Standards)", Journal of the Society of Rubber Science and Technology, Japan, vol. 52, No. 1, pp. 9-18, 1979, cited in ISR.

* cited by examiner

*Primary Examiner* — Philip C Tucker
*Assistant Examiner* — Jimmy R Smith, Jr.
(74) *Attorney, Agent, or Firm* — Wenderoth, Lind & Ponack, L.L.P.

(57) ABSTRACT

A pressure-sensitive adhesive tape of the present invention includes a paper base material and a pressure-sensitive adhesive layer provided on a surface of the paper base material, wherein the pressure-sensitive adhesive layer includes a rubber component containing natural rubber, wherein the pressure-sensitive adhesive layer has a biobased content of 15% or more, SP adhesive force of 4 N/24 mm or more, and a ball tack value of 8 or more. According to the present invention, the pressure-sensitive adhesive tape having a reduced environmental impact and excellent packing performance can be provided.

3 Claims, 1 Drawing Sheet

PRESSURE-SENSITIVE ADHESIVE TAPE AND PRODUCTION METHOD THEREFOR

TECHNICAL FIELD

The present invention relates to a pressure-sensitive adhesive tape, and a method for producing the same.

BACKGROUND ART

In recent years, environmental issues such as global warming have become more important, and it has become desirable to reduce an amount of fossil resource-based materials such as petroleum to be used. In the pressure-sensitive adhesive tape, attempts to use natural rubber and so on as materials having a high biobased content have been made.

In PTL1, for example, disclosed is an invention relating to a pressure-sensitive adhesive composition including a specific styrene-isoprene-styrene block copolymer (SIS), natural rubber, a tackifier, and a petroleum-based plasticizer. According to the pressure-sensitive adhesive composition, it is described that the pressure-sensitive adhesive tape or the like having excellent practical properties can be obtained even if an applied thickness is thin.

In PTL2, further, disclosed is an invention relating to a pressure-sensitive adhesive sheet for electronic devices, wherein a pressure-sensitive adhesive layer composed of a natural rubber-based pressure-sensitive adhesive is provided; and the pressure-sensitive adhesive layer includes 50% or more of biomass-derived carbon and has 20% by weight or more of acrylic monomer-derived repeating units and 1.8 MPa or more of shear adhesive force. According to the pressure-sensitive adhesive sheet for electronic devices, it is described that dependence on the fossil resource-based materials is suppressed and the pressure-sensitive adhesive sheet suitable for electronic device application can be provided.

CITATION LIST

Patent Literature

PTL1: JP 2016-186015 A

PTL2: JP 2020-050711 A

SUMMARY OF INVENTION

Technical Problem

By the way, pressure-sensitive adhesive tapes are used in various fields, for example, as a tape used for packing and so on, a kraft pressure-sensitive adhesive tape using kraft paper as a base material is widely used. In such a kraft pressure-sensitive adhesive tape, too, use of natural rubber is also expected from a viewpoint of reducing an environmental impact. However, the natural rubber is generally less processable than synthetic rubber, and in particular when attempting to form a pressure-sensitive adhesive layer without use of a solvent, troubles such as reduced packing performance with respect to corrugated cardboard are likely to occur.

Therefore, an objective of the present invention is to provide a pressure-sensitive adhesive tape having a low environmental impact and excellent packing performance.

Solution to Problem

The present inventors have found, as a result of intensive studies, that the above problems can be solved by a pressure-sensitive adhesive tape comprising a paper base material and a pressure-sensitive adhesive layer provided on a surface of the paper base material, the pressure-sensitive adhesive layer comprising a rubber component comprising natural rubber, a biobased content of the pressure-sensitive adhesive layer being a certain level or more, and SP adhesive force and a ball tack value thereof being a certain level or more, and have completed the following present invention.

The summaries of the present invention are [1] to [8] as follows.

[1] A pressure-sensitive adhesive tape comprising a paper base material and a pressure-sensitive adhesive layer provided on a surface of the paper base material,
 the pressure-sensitive adhesive layer comprising a rubber component comprising natural rubber,
 the pressure-sensitive adhesive layer having a biobased content of 15% or more, SP adhesive force of 4 N/24 mm or more, and a ball tack value of 8 or more.

[2] The pressure-sensitive adhesive tape according to the above [1], wherein an amount of a residual solvent in the pressure-sensitive adhesive layer is less than 10 ppm.

[3] The pressure-sensitive adhesive tape according to the above [1] or [2], wherein a value obtained by dividing the number of unmelted materials of the rubber component having a long diameter of 100 μm or more observed per a 50 mm square in the pressure-sensitive adhesive layer by a thickness (μm) of the pressure-sensitive adhesive layer is 0.1 or less.

[4] The pressure-sensitive adhesive tape according to any one of the above [1] to [3], wherein Mooney viscosity ($ML_{1+4}$) of the natural rubber is 20 to 120.

[5] The pressure-sensitive adhesive tape according to any one of the above [1] to [4], wherein the paper base material is kraft paper.

[6] A method for producing the pressure-sensitive adhesive tape according to any one of the above [1] to [5], the method comprising a step of forming a pressure-sensitive adhesive layer by feeding raw materials comprising a rubber component comprising natural rubber to an extruder, and extruding a pressure-sensitive adhesive composition which is melted and kneaded.

[7] The method for producing the pressure-sensitive adhesive tape according to the above [6], wherein the natural rubber is in a form of pellets.

[8] The method for producing the pressure-sensitive adhesive tape according to the above [6] or [7], wherein the extruder comprises a plurality of raw material feed ports, and the rubber component comprising the natural rubber is fed to a first raw material feed port which is a first feed port.

Advantageous Effects of Invention

According to the present invention, a pressure-sensitive adhesive tape having a low environmental impact and excellent packing performance can be provided.

DESCRIPTION OF EMBODIMENTS

[Pressure-Sensitive Adhesive Tape]

A pressure-sensitive adhesive tape of the present invention comprises a paper base material and a pressure-sensitive adhesive layer provided on a surface of the paper base material, the pressure-sensitive adhesive layer comprising a rubber component comprising natural rubber, a biobased content of the pressure-sensitive adhesive layer being 15% or more, SP adhesive force thereof being 4 N/24 mm or more, and a ball tack value thereof being 8 or more.

Hereinafter, with reference to drawings, the pressure-sensitive adhesive tape with respect to embodiments of the present invention will be described in detail. Still, the pressure-sensitive adhesive tape of the present invention is not limited to contents of the drawings.

Figure 1:
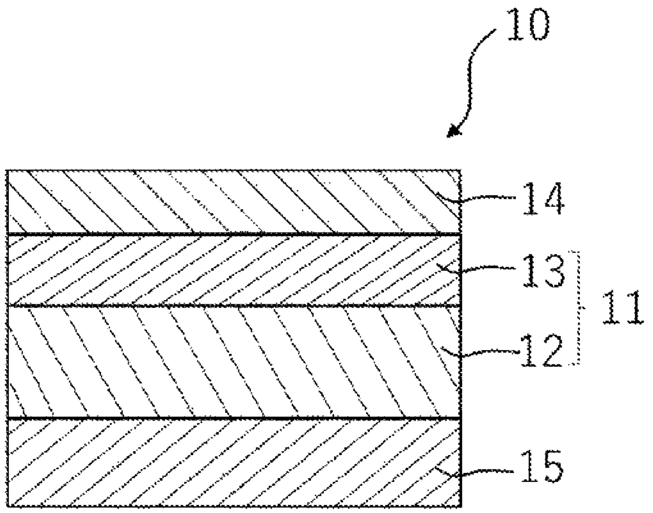
FIG. 1 is a schematic cross-sectional view showing a pressure-sensitive adhesive tape with respective to one embodiment of the present invention.

A pressure-sensitive adhesive tape 10 with respect to one embodiment of the present invention comprises a paper base material 12 and a pressure-sensitive adhesive layer 15 provided on one surface of the paper base material 12. In FIG. 1, the paper base material 12 and the pressure-sensitive adhesive layer 15 are directly laminated, but other layers may be provided between the paper base material 12 and the pressure-sensitive adhesive layer 15.

On a surface of the paper base material 12 opposite to the surface on which the pressure-sensitive adhesive layer 15 is provided, a resin layer 13 is provided. Still, in FIG. 1, the laminate of the paper base material 12 and the resin layer 13 is represented as a base material 11.

In addition, on a surface of the resin layer 13 opposite to the surface on which the paper base material 12 is provided, a release agent layer 14 is provided.

The pressure-sensitive adhesive tape 10 is a multilayer structure in which the pressure-sensitive adhesive layer 15, the paper base material 12, the resin layer 13, and the release agent layer 14 are laminated in this order.

Details of the pressure-sensitive adhesive layer 15, the paper base material 12, the resin layer 13, and the release agent layer 14 will be described later.

<SP Adhesive Force>

The SP adhesive force of the pressure-sensitive adhesive tape of the present invention is 4 N/24 mm or more. If the SP adhesive force is less than 4 N/24 mm, the packing performance of the pressure-sensitive adhesive tape is reduced. The SP adhesive force of the pressure-sensitive adhesive tape is preferably 6 N/24 mm or more, more preferably 8 N/24 mm or more. An upper limit of the SP adhesive force of the pressure-sensitive adhesive tape is not particularly limited, but the SP adhesive force is practically 30 N/24 mm or less. The SP adhesive force of the pressure-sensitive adhesive tape can be adjusted by a composition of the pressure-sensitive adhesive layer, a method for producing the pressure-sensitive adhesive layer, and the like.

The SP adhesive force is 1800 peeling adhesive force measured in accordance with JIS Z0237:2009.

<Ball Tack Value>

The ball tack value of the pressure-sensitive adhesive tape of the present invention is 8 or more. If the ball tack value is less than 8, the packing performance of the pressure-sensitive adhesive tape is reduced. From a viewpoint of improving the packing performance, the ball tack value of the pressure-sensitive adhesive tape is more preferably 10 or more, even more preferably 15 or more, and practically 30 or less.

Setting both the SP adhesive force and the ball tack value of the pressure-sensitive adhesive tape at the above-described certain values or more achieves to easily improve the packing performance.

The ball tack value can be adjusted to a desired value by amounts of a tackifier resin, calcium carbonate, and oil, blended, as well as an amount kneaded described later or the like when producing the pressure-sensitive adhesive tape.

Still, the ball tack value is a value measured with respect to the pressure-sensitive adhesive layer of the pressure-sensitive adhesive tape at an inclination angle of 30° in accordance with JIS Z0237:2009.

<Pressure-Sensitive Adhesive Layer>

Hereinafter, the pressure-sensitive adhesive layer constituting the pressure-sensitive adhesive tape will be described.

(Rubber Component)

The pressure-sensitive adhesive layer comprises a rubber component comprising natural rubber. Comprising the natural rubber increases a biobased content described later, and reduces an amount of fossil resource-based materials used, thereby providing the pressure-sensitive adhesive tape with a suppressed environmental impact.

The natural rubber is a rubber-like polymeric substance mainly obtained from natural plants, and includes, e.g., a smoked sheet, pale crepe, an air-dried sheet, skim rubber, SP rubber, TC rubber, and MG rubber.

The Mooney viscosity ($ML_{1+4}$) of the natural rubber is preferably 20 or more, more preferably 30 or more, even more preferably 40 or more, particularly preferably 55 or more, and preferably 120 or less, more preferably 100 or less.

When the Mooney viscosity of the natural rubber is these lower limits or more, the adhesive force of the pressure-sensitive adhesive tape is enhanced, to improve the packing performance. On the other hand, when the Mooney viscosity of the natural rubber is these upper limits or less, processability when producing the pressure-sensitive adhesive tape is improved.

Still, the Mooney viscosity in the present description refers to the Mooney viscosity at 100° C., and is measured in accordance with JIS K6300-2013.

The rubber component may include rubber other than the natural rubber. Examples of the rubber other than the natural rubber include ethylene propylene rubber (EPDM), chloroprene rubber (CR), isoprene rubber, butyl rubber (IIR), butadiene rubber (BR), chlorosulfonated polyethylene, a thermoplastic elastomer, etc. Above all, the thermoplastic elastomer is preferable.

As the thermoplastic elastomer, preferably used is a styrene-based thermoplastic elastomer, which styrene and isoprene are block copolymerized, and specifically included are a styrene-isoprene-styrene block copolymer (SIS), a styrene-isoprene block copolymer (SI), etc., and above all, more preferable is the SIS.

A content of the natural rubber in the rubber component is not particularly limited as long as the biobased content of the pressure-sensitive adhesive layer is within a range described later. The content of the natural rubber is, e.g., 10 parts by mass or more, preferably 20 parts by mass or more, more preferably 40 parts by mass or more, when a total amount of the rubber components is 100 parts by mass, from a viewpoint of increasing the biobased content, and is preferably 90 parts by mass or less, more preferably 80 parts by mass or less, from a viewpoint of the processability or the like. However, depending on production conditions, the content of the natural rubber may be 100 parts by mass.

The content of the rubber component based on the total amount of the pressure-sensitive adhesive layer is not particularly limited, but preferably 10 to 90% by mass, more preferably 20 to 70% by mass.

(Tackifier Resin)

It is preferable that the pressure-sensitive adhesive layer includes a tackifier resin in addition to the rubber component described above. Including the tackifier resin allows to improve the pressure-sensitive adhesive performance of the pressure-sensitive adhesive layer. Examples of the tackifier resin include rosin-based resins, terpene-based resins, coumarone-indene resins, petroleum resins, terpene-phenol resins, etc., and among these, the petroleum resins are preferable from a viewpoint of cost. The petroleum resins include C5 petroleum resins, C9 petroleum resins, C5-C9 petroleum resins, etc., and the C9 petroleum resins or C5-C9 petroleum resins are preferable. Further, from the viewpoint of increasing the biobased content, the rosin-based resins and the terpene-based resins derived from natural products are preferable. A content of the tackifier resin in the pressure-sensitive adhesive layer is, e.g., 20 parts by mass or more and 200 parts by mass or less, preferably 50 parts by mass or more and 150 parts by mass or less, with respect to 100 parts by mass of the rubber component.

(Softener)

The pressure-sensitive adhesive layer may include a softener. The pressure-sensitive adhesive layer is softened by including the softener, thereby becoming good in applicability, the pressure-sensitive adhesive performance, or the like. Examples of the softener include mineral oil such as paraffin oil and naphthenic oil (also called process oil), liquid polybutene, liquid lanolin, liquid polyisoprene, liquid polyacrylate, etc. A content of the softener in the pressure-sensitive adhesive layer is, e.g., 5 parts by mass or more and 80 parts by mass or less, preferably 10 parts by mass or more and 50 parts by mass or less, with respect to 100 parts by mass of the rubber component.

For the pressure-sensitive adhesive layer, in addition to the described above, other known additives used for the pressure-sensitive adhesive layer such as a filler, an antioxidant, an anti-aging agent, a UV inhibitor, and a pigment may be blended as appropriate.

(Biobased Content)

The biobased content of the pressure-sensitive adhesive layer in the present invention is 15% or more. If the biobased content is less than 15%, the amount of fossil resource-based materials used is relatively large, resulting in an increased environmental impact. The biobased content of the pressure-sensitive adhesive layer is preferably 20% or more, more preferably 30% or more, even more preferably 40% or more, and particularly preferably 50% or more. An upper limit of the biobased content of the pressure-sensitive adhesive layer is 100%, but, in consideration of the processability and the like, and in consideration of other cases such as when used in combination with rubber other than the natural rubber, the biobased content is preferably 80% or less.

Still, the biobased content is a value as measured in accordance with ASTM D6866, and can be estimated from a carbon isotope content of 14 of mass number.

(Residual Solvent)

An amount of a residual solvent in the pressure-sensitive adhesive layer is preferably less than 10 ppm, more preferably 3 ppm or less, even more preferably 0 ppm. Still, in the present description, "ppm" refers to an amount on a mass scale.

The residual solvent is due to a solvent contained in the pressure-sensitive adhesive composition used when producing the pressure-sensitive adhesive layer, for example, when the pressure-sensitive adhesive layer is formed by the pressure-sensitive adhesive composition containing a solvent, the amount of the residual solvent usually exceeds 10 ppm. Therefore, it is preferable that the pressure-sensitive adhesive composition for forming the pressure-sensitive adhesive layer is free of the solvent.

By performing a method of forming the pressure-sensitive adhesive layer without using the solvent, it is possible to reduce carbon dioxide emissions, thereby reducing the environmental impact. In addition, as a result, the amount of the residual solvent in the pressure-sensitive adhesive layer can be easily adjusted as described above.

The amount of the residual solvent in the pressure-sensitive adhesive layer can be measured by gas chromatography.

(Unmelted Materials)

The pressure-sensitive adhesive layer preferably has an amount of unmelted materials, which is a value obtained by dividing the number of the unmelted materials of the rubber component having a long diameter of 100 μm or more observed per a 50 mm square by a thickness of the pressure-sensitive adhesive layer (μm) of 0.1 or less. When the amount of the unmelted materials is 0.1 or less, an appearance of the pressure-sensitive adhesive tape becomes good and the packing performance is also easily improved. The amount of the unmelted materials is preferably 0.08 or less, more preferably 0.05 or less, even more preferably 0.

In general, when the pressure-sensitive adhesive layer is formed by using the rubber component comprising natural rubber as a raw material and without using a solvent, the unmelted materials due to the natural rubber are often identified, but the pressure-sensitive adhesive layer of the present invention can reduce the number of unmelted materials. For example, by applying the production method described later, generation of the unmelted materials can be suppressed.

The number of the unmelted materials of the rubber component having the long diameter of 100 μm or more is determined by observing an area of a 50 mm square (50 mm in length and 50 mm in width) on a surface of the pressure-sensitive adhesive layer using a microscope. More specifically, 10 areas of the 50 mm square on the surface of the pressure-sensitive adhesive layer are measured and the number of unmelted materials of the rubber component having the long diameter of 100 μm or more are determined in each area, and the average value is taken as the number of the unmelted materials of the rubber component having the long diameter of 100 μm or more observed per a 50 mm square in the present invention.

The unmelted materials of the rubber component in the pressure-sensitive adhesive layer are observed as transparent foreign substances which exist as islands in a melt (matrix). Interfaces between the unmelted materials and the melt can be recognized from a difference in a light transmission state and a refractive index, and the unmelt materials are observed as transparent unspecified shapes.

Still, the long diameter of the unmelted materials is the maximum linear distance between any two points on a periphery of the observed unmelted material.

(Thickness)

The thickness of the pressure-sensitive adhesive layer is not particularly limited, but is preferably 10 μm or more, more preferably 15 μm or more, even more preferably 20 μm or more, and preferably 150 μm or less, more preferably 100 μm or less. When the thickness of the pressure-sensitive adhesive layer is these lower limits or more, it becomes easier to ensure the pressure-sensitive adhesive performance. On the other hand, when the thickness of the pressure-sensitive adhesive layer is these upper limits or less, the amount of the pressure-sensitive adhesive used can be reduced.

<Paper Base Material>

The paper base material of the pressure-sensitive adhesive tape of the present invention is not particularly limited, but includes kraft paper, glassine paper, high-quality paper and the like, above all, the kraft paper is preferable. Using the kraft paper allows the pressure-sensitive adhesive tape to become suitably usable for packing and the like. Namely, as the pressure-sensitive adhesive tape of the present invention, a kraft pressure-sensitive adhesive tape using the kraft paper as the paper base material is preferable.

Examples of the kraft paper include unbleached kraft paper, semi-bleached kraft paper, bleached kraft paper, Clupak-processed paper to give elongation to these, wet-strength processed paper to give wet strength to these, and so on.

The thickness of the paper base material is not particularly limited, but is preferably 10 g/m$^2$ or more and 150 g/m$^2$ or less, more preferably 40 g/m$^2$ or more and 100 g/m$^2$ or less, in terms of a basis weight.

<Resin Layer>

A type of the resin layer is not particularly limited, but it is preferable that it is a polyolefin resin layer from a viewpoint of adhesion or the like to the paper base material. As the polyolefin resin used for the polyolefin resin layer, polyethylene-based resins and polypropylene-based resins are preferable, but the polyethylene-based resins are more preferable. Namely, it is preferable that the resin layer is a polyethylene-based resin layer.

By using the polyethylene-based resin, heat resistance, the adhesion to the paper base material, and the like are likely to be good.

A thickness of the resin layer is not particularly limited, but is, e.g., preferably 5 μm or more and 100 μm or less, more preferably 10 μm or more and 50 μm or less.

In addition, a total thickness of the paper base material and the resin layer is not particularly limited, but is, e.g., 10 μm or more and 1,000 μm or less.

<Release Agent Layer>

It is preferable that the pressure-sensitive adhesive tape of the present invention is provided with a release agent layer on a surface of the resin layer, opposite to the surface with which the paper base material is provided. Providing with the release agent layer, when the pressure-sensitive adhesive tape is wound in a roll form to make a wound body, allows the pressure-sensitive adhesive layer to contact with the release agent layer. Therefore, the pressure-sensitive adhesive tape becomes possible to be easily taken out from the wound body.

The release agent layer may be formed from a well-known release agent such as a silicone-based release agent and a long-chain alkyl-based release agent. A thickness of the release agent layer is not particularly limited, but may be prepared so that an amount of adhesion is, e.g., 0.1 g/m$^2$ or more and 10 g/m$^2$ or less, preferably 0.3 g/m$^2$ or more and 5 g/m$^2$ or less.

The pressure-sensitive adhesive tape should be wound into a roll form to make the wound body as described above. The pressure-sensitive adhesive tape should be wound in a roll form, for example, centering a roll core. When making the wound body, the pressure-sensitive adhesive tape should be wound so that the pressure-sensitive adhesive layer is inside and the release agent layer is outside, thereby the outermost peripheral surface of the wound body can be made to be the release agent layer. The pressure-sensitive adhesive tape is made into a wound body, and thus also suitable as the pressure-sensitive adhesive tape for packing or the like.

Of course, the pressure-sensitive adhesive tape does not need to be made into the wound body, and it may be a sheet form as it is. In such a case, a release sheet or the like to protect the pressure-sensitive adhesive layer may be attached to the surface of the pressure-sensitive adhesive layer, and also the release agent layer may be omitted as appropriate.

[Method for Producing Pressure-Sensitive Adhesive Tape]

It is preferable that the pressure-sensitive adhesive layer in the pressure-sensitive adhesive tape of the present invention is produced with a pressure-sensitive adhesive composition comprising a rubber component comprising natural rubber. The pressure-sensitive adhesive composition may also include the tackifier resin, the softener, the additives, etc. described above as necessary. The content of the natural rubber in the rubber component in the pressure-sensitive adhesive composition, the amount of the tackifier resin and the amount of the softener with respect to 100 parts by mass of the rubber component, and the like, are the same as those in the pressure-sensitive adhesive layer described above.

It is preferable that the pressure-sensitive adhesive composition for forming the pressure-sensitive adhesive layer does not include a solvent. In other words, it is preferable that the pressure-sensitive adhesive layer is formed without using a solvent. This can reduce the amount of the residual solvent in the pressure-sensitive adhesive layer, thereby reducing the environmental impact.

In the method for producing the pressure-sensitive adhesive tape of the present invention, it is preferable that the method comprises a step of forming the pressure-sensitive adhesive layer by feeding raw materials comprising a rubber component comprising natural rubber in an extruder, and extruding the pressure-sensitive adhesive composition which is melted and kneaded. By melting and kneading in the extruder in this manner, the pressure-sensitive adhesive layer can be properly formed even when using the pressure-sensitive adhesive composition free of the solvent. Here, the raw materials comprising the rubber component comprising natural rubber are components each constituting the pressure-sensitive adhesive layer, and examples include the tackifier resin, the softener, the additives, or the like, blended as needed, other than the rubber component comprising natural rubber.

It is preferable that the natural rubber used as a raw material (natural rubber before kneading) is in a form of pellets. By using natural rubber of the pellets, it becomes easier to knead, resulting in reducing unmelted materials in the pressure-sensitive adhesive layer. A shape of the pellets is not particularly limited, and examples include, e.g., rectangular, columnar, cubic, spherical, etc.

An average particle diameter of the pellets of the natural rubber is preferably 3 to 100 mm, more preferably 3 to 60 mm, even more preferably 3 to 30 mm. When the average particle diameter of the natural rubber is relatively small like this, even when an amount kneaded, which is determined by a kneading temperature, shear force, a kneading time, and the like, is set at relatively low, the unmelted materials can be reduced and the decrease in adhesive force due to deterioration of the natural rubber can be prevented. The above average particle diameter is calculated by averaging the maximum length of any arbitrary 100 particles.

The extruder is equipped with a plurality of feed ports, and it is preferable that the rubber component comprising natural rubber is fed to a first raw materials feed port, which is a first feed port. Furthermore, when at least one component of the tackifier resin and the softener is used as a raw material, it is preferable that at least one component of the tackifier resin and the softener is fed from a feed port other than the first raw material feed port. This makes it easy to apply shear force to the rubber component, thereby making it difficult for the unmelted materials to be generated and making it easy to improve the packing performance. As the extruder, either a single-screw extruder or a twin-screw extruder can be used, but the twin-screw extruder is preferable from a viewpoint of reducing the unmelted materials.

Hereinafter, using drawings, a suitable aspect of the method for producing the pressure-sensitive adhesive tape of the present invention will be described. Still the present invention is not limited to the drawings.

Figure 2:
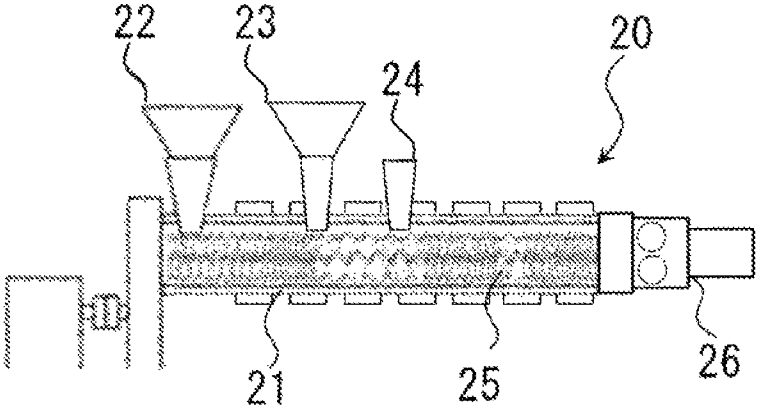
FIG. 2 is an explanation drawing explaining a method for producing a pressure-sensitive adhesive layer of the present invention.

An extruder 20 shown in FIG. 2 comprises a barrel 21 equipped with a screw 25 inside, a die 26 for extruding the pressure-sensitive adhesive composition provided at an end portion of the barrel 21, and a first raw material feed port 22, a second raw material feed port 23, and a third raw material feed port 24 equipped at upper portions of the barrel 21.

The raw materials fed from each raw material feed port are melted, and moved to a method to the die 26 while being kneaded by the screw 25. Therefore, the raw material fed from the first raw material feed port will be kneaded for a longest time. By using the extruder equipped with the plurality of raw material feed ports like this, it becomes easier to produce the pressure-sensitive adhesive layer with reduced unmelted materials in the pressure-sensitive adhesive layer.

It is preferable that from the first raw material feed port 22, which is the first feed port, the rubber component comprising natural rubber is fed. Further, it is preferable that other raw materials other than the rubber component are fed from feed ports other than the first raw material feed port. For example, when any component of the tackifier resin and the softener is used as a raw material, it is preferable that any component of the tackifier resin and the softener is fed from a feed port other than the first raw material feed port. This makes it easy to apply shear force to the rubber component, thereby making it difficult for unmelted materials to be generated and making it easy to improve the packing performance. From a viewpoint of making it easier to apply shear force to the rubber component, it is preferable that the tackifier resin is fed from the second raw material feed port and process oil is fed from the third raw material feed port.

When fillers such as calcium carbonate, and additives such as an anti-aging agent are used as raw materials, their feed positions are not particularly limited, but they are preferably fed from a feed port other than the first raw material feed port 22, and above all, preferably fed from the second raw material feed port 23.

In kneading by the extruder, it is preferable that the amount kneaded, which is determined by the kneading temperature, the shear rate, the kneading time, and the like, is appropriately adjusted. Suppressing the amount kneaded at a certain level or less without making it too large, achieves to suppress cutting of the molecular chains of the natural rubber, and thus the SP adhesive force of the pressure-sensitive adhesive tape can be easily adjusted to the desired range described above. On the other hand, setting the amount kneaded at a certain level or more without making it too small, achieves to easily adjust the ball tack value to the desired range described above.

With respect to the kneading temperature, the shear rate, and the kneading time, if any one of them is set at a high (long) value, others are set at a low (short) value, that is, the amount kneaded as a total may be adjusted, and thus the individual values are not particularly limited, but can be set as follows.

That is, the kneading temperature is, e.g., 80 to 220° C., preferably 100 to 200° C., more preferably 130 to 180° C.

The shear rate is, e.g., 10 to 300 (1/second), preferably 15 to 150 (1/second), more preferably 20 to 50 (1/second).

The kneading time is, e.g., 10 to 1,000 seconds, preferably 100 to 700 seconds, more preferably 200 to 500 seconds.

It is preferable that the pressure-sensitive adhesive composition is extruded on a surface of the paper base material by an extruder, to form the pressure-sensitive adhesive layer, thereby producing the pressure-sensitive adhesive tape. Alternatively, as another method, the pressure-sensitive adhesive composition is extruded on a surface of a release film and the like, to form the pressure-sensitive adhesive layer, and then the pressure-sensitive adhesive layer may be peeled from the release film, and laminated on the paper base material, to produce the pressure-sensitive adhesive tape.

EXAMPLES

Examples of the present invention will be described as follows. However, the present invention is not limited to the following examples.

Measurement methods and evaluation methods are as follows.

<Biobased Content>

The biobased content of the pressure-sensitive adhesive layer was measured in accordance with ASTM D6866.

<Residual Solvent>

The amount of the residual solvent in the pressure-sensitive adhesive layer was measured by gas chromatography (GC-2014 produced by Shimadzu Corporation) under the following conditions.

Vial warming temperature: 100° C.
Vial warming time: 8 minutes
Injection volume: 1.0 mL
Column: RTX-1 (0.32 mm in internal diameter×30 m in length, 0.5 m in film thickness)
Column temperature: 50° C.
Inlet temperature: 150° C.
Column inlet pressure: 100 kPa
Column flow amount: 3.4 mL/min
Detector: FID
Sample volume: 10 cm×10 cm <SP Adhesive Force>

Under an environment of room temperature (23° C.) and 50% of relative humidity, a pressure-sensitive adhesive layer side of the pressure-sensitive adhesive tape was pressed back and forth twice with a 2 kg roller onto a SUS 304 steel plate. After leaving the tape in this environment for 30 minutes, 1800 peel strength at 24 mm in width was measured by a tensile testing machine at a condition of 300 mm/minute of a tensile speed in accordance with a method of JIS Z0237, and this was taken as the SP adhesive force.

<Ball Tack Value>

The ball tack value of the pressure-sensitive adhesive layer was measured at 30° of an inclination angle in accordance with JISZ 0237:2009.

<Amount of Unmelted Materials>

A 50 mm square area of a surface of the pressure-sensitive adhesive layer in the pressure-sensitive adhesive tape was observed at 100 of magnification by a microscope (VHX-6000, produced by Keyence Corporation) to determine the number of the unmelted materials of the rubber component having the long diameter of 100 μm or more. The number of the unmelted materials of the rubber component having the long diameter of 100 μm or more was determined as an average value of observations at 10 locations of the 50 mm square area. The number of the unmelted materials observed per the 50 mm square area thus determined was divided by a thickness of the pressure-sensitive adhesive layer, to calculate the amount of unmelted materials.

<Corrugated Cardboard Packing Performance>

With a commercially available corrugated cardboard box (having 400 mm×320 mm×300 mm in dimension, 400 mm in length at flap abutted portions), a piece of a 50 mm wide pressure-sensitive adhesive tape was put at the flap abutted portions at 25° C. by I paste, then pressure bonded at 100 g/50 mm, and a peeling ratio after standing for 24 hours was measured, and evaluated based on the following evaluation criteria. The peeling ratio was an area ratio of a portion peeled off with respect to the pressure-sensitive adhesive tape used.

AA: the peeling ratio was 25% or less, and excellent pressure-sensitive adhesive performance could be maintained over a long period of time.

A: the peel ratio was more than 25% and 40% or less, and a certain level of the pressure-sensitive adhesive performance could be maintained over a long period of time.

B: the peeling ratio was more than 40% and 50% or less, and a practically usable pressure-sensitive adhesive performance could be maintained over a long period of time.

C: the peeling ratio was more than 50%, and the pressure-sensitive adhesive performance could not be maintained for a long period of time.

<Raw Materials for Pressure-Sensitive Adhesive Layer>

Styrene-isoprene-styrene block copolymer (trade name "SIS5506" produced by JSR Corporation)

Natural rubber 1: pellets, average particle diameter 20 mm, Mooney viscosity 100

Natural rubber 2: pellets, average particle diameter 20 mm, Mooney viscosity 40

Natural rubber 3: pellets, average particle diameter 20 mm, Mooney viscosity 30

Natural rubber 4: pellets, average particle diameter 70 mm, Mooney viscosity 100

The above each natural rubber 1-4 was one which RSS 1 grade was pelletized by plain kneading. The Mooney viscosity was adjusted by plain kneading time.

C5 petroleum resin (trade name "Quinton A-100," produced by ZEON Corporation)

C9 petroleum resin (trade name "Nisseki Neopolymer 120," produced by ENEOS Corporation)

C5/C9 resins (trade name "Quinton D-200," produced by ZEON Corporation)

Terpene phenolic resin (trade name "YS POLYESTER T100," produced by Yasuhara Chemical Co., Ltd.)

Process oil (trade name "Kurisef oil F220," produced by JXTG Nippon Oil & Energy Corporation)

Calcium carbonate (NS #100, produced by Nitto Funka Kogyo K.K.)

Anti-aging agent (trade name "Yoshinox 425," produced by Yoshitomi Pharmaceutical Industries, Ltd.)

Example 1

Polyethylene (PE) was extrusion-laminated so that its thickness was 20 μm on one surface of an unbleached kraft paper having 73 g/m$^2$ of a basis weight which was subjected to the Clupak processing and the wet-strength processing, to form a polyethylene-based resin layer on the one surface of the kraft paper. On the polyethylene-based resin layer obtained, a silicone-based release agent was applied and dried so that an adhering amount after drying was 1 g/m$^2$, to form a release agent layer.

Next, the pressure-sensitive adhesive composition including the rubber component, the tackifier resin, the softener, and the additives shown in Table 1 was extruded by an extruder onto the surface of the kraft paper to form a pressure-sensitive adhesive layer (100 μm in thickness) of the composition shown in Table 1, to produce a pressure-sensitive adhesive tape.

The method for producing the pressure-sensitive adhesive layer is described in reference with drawings as follows.

As shown in FIG. 2, used was an extruder 20 comprising a barrel 21 equipped with a screw 25 inside, a die 26 for extruding the pressure-sensitive adhesive composition provided at an end portion of the barrel 21, a first raw material feed port 22, a second raw material feed port 23, and a third raw material feed port 24 provided at upper portions of the barrel 21. The first raw material feed port 22 is a hopper and the second raw material feed port is a side feeder. Further, from the third raw material feed port, the raw materials are introduced by using a liquid adding pump.

Introduced into the barrel were the rubber component from the first raw material feed port 22, the petroleum resin, the calcium carbonate, and the anti-aging agent from the second raw material feed port 23, and the process oil from the third raw material feed port 24; and the pressure-sensitive adhesive composition kneaded by the screw was extruded through the die to form the pressure-sensitive adhesive layer on the kraft paper, to produce the pressure-sensitive adhesive tape. Kneading was performed under the conditions of 150 (° C.) of a kneading temperature, 28 (1/second) of a shear rate, and 360 (seconds) of a kneading time. Still, the kneading time was defined as a time from feeding of the raw material from the first raw material feed port to extruding of the pressure-sensitive adhesive composition.

Examples 2 to 14, Comparative Examples 1 to 9

The pressure-sensitive adhesive tapes were produced in the same manner as in Example 1, except that the types and the amounts of raw materials to produce the pressure-sensitive adhesive layer and the production conditions of the pressure-sensitive adhesive layer were changed as shown in Tables 1 and 2. Still, #22 to #24 in the Tables refer to the feed ports of the raw materials in FIG. 2, and for example, when #22 is recited, it means that the raw material was fed from the first raw material feed port.

Comparative Examples 10, 11

Using the pressure-sensitive adhesive composition which the rubber component, the tackifier resin, the softener, and the additives of the types and the amount shown in Table 2 were mixed and kneaded under the conditions of Table 2, the pressure-sensitive adhesive layer was formed on the kraft paper, to produce the pressure-sensitive adhesive tape.

TABLE 1

| | | | Example 1 | Example 2 | Example 3 | Example 4 | Example 5 | Example 6 | Example 7 |
|---|---|---|---|---|---|---|---|---|---|
| Pressure-sensitive adhesive layer (parts by mass) | Rubber component | Styrene-isoprene-styrene block copolymer | 20 | 60 | 20 | 20 | 20 | 20 | 20 |
| | | Natural rubber 1 (Average particle diameter 20 mm, Mooney viscosity 100) | 80 | 40 | 0 | 80 | 80 | 80 | 80 |
| | | Natural rubber 2 (Average particle diameter 20 mm, Mooney viscosity 40) | 0 | 0 | 80 | 0 | 0 | 0 | 0 |
| | | Natural rubber 3 (Average particle diameter 20 mm, Mooney viscosity 30) | 0 | 0 | 0 | 0 | 0 | 0 | 0 |
| | | Natural rubber 4 (Average particle diameter 70 mm, Mooney viscosity 100) | 0 | 0 | 0 | 0 | 0 | 0 | 0 |
| | Tackifier resin | Quinton A100 (C5 resin) | 120 | 120 | 120 | 120 | 120 | 120 | 120 |
| | | Nisseki Neopolymer 120 (C9 resin) | 0 | 0 | 0 | 0 | 0 | 0 | 0 |
| | | Quinton D200 (C5C9 resin) | 0 | 0 | 0 | 0 | 0 | 0 | 0 |
| | | YS polystar T100 (terpene phenol resin) | 0 | 0 | 0 | 0 | 0 | 0 | 0 |
| | Softener | Process oil | 40 | 40 | 40 | 40 | 40 | 40 | 40 |
| | Additives | Calcium carbonate | 40 | 40 | 40 | 40 | 40 | 40 | 40 |
| | | Anti-aging agent | 1 | 1 | 1 | 1 | 1 | 1 | 1 |
| Production conditions of pressure-sensitive adhesive layer | | Kneading temperature (° C.) | 150 | 150 | 150 | 150 | 150 | 100 | 200 |
| | | Shear rate (1/second) | 28 | 28 | 28 | 170 | 282 | 28 | 28 |
| | | Kneading time (seconds) | 360 | 360 | 360 | 60 | 36 | 360 | 360 |
| | | Rubber component feed position | # 22 | # 22 | # 22 | # 22 | # 22 | # 22 | # 22 |
| | | Petroleum resin feed position | # 23 | # 23 | # 23 | # 23 | # 23 | # 23 | # 23 |
| | | Calcium carbonate feed position | # 23 | # 23 | # 23 | # 23 | # 23 | # 23 | # 23 |
| | | Anti-aging agent feed position | # 23 | # 23 | # 23 | # 23 | # 23 | # 23 | # 23 |
| | | Process oil feed position | # 24 | # 24 | # 24 | # 24 | # 24 | # 24 | # 24 |
| Evaluation | | Biobased content (%) | 34 | 17 | 34 | 34 | 34 | 34 | 34 |
| | | Amount of unmelted materials | 0.10 | 0.05 | 0.00 | 0.00 | 0.00 | 0.20 | 0.00 |
| | | Residual solvent (ppm) | 1 | 1 | 1 | 1 | 1 | 1 | 1 |
| | | SP adhesive force (N/24 mm) | 9 | 9 | 5 | 7 | 6 | 12 | 6 |
| | | Ball tack value | 18 | 18 | 17 | 19 | 20 | 12 | 18 |
| | | Corrugated cardboard packing performance | AA | AA | A | A | A | B | A |

| | | | Example 8 | Example 9 | Example 10 | Example 11 | Example 12 | Example 13 | Example 14 |
|---|---|---|---|---|---|---|---|---|---|
| Pressure-sensitive adhesive layer (parts by mass) | Rubber component | Styrene-isoprene-styrene block copolymer | 20 | 20 | 20 | 20 | 0 | 0 | 20 |
| | | Natural rubber 1 (Average particle diameter 20 mm, Mooney viscosity 100) | 0 | 80 | 80 | 80 | 100 | 100 | 0 |
| | | Natural rubber 2 (Average particle diameter 20 mm, Mooney viscosity 40) | 0 | 0 | 0 | 0 | 0 | 0 | 0 |
| | | Natural rubber 3 (Average particle diameter 20 mm, Mooney viscosity 30) | 0 | 0 | 0 | 0 | 0 | 0 | 80 |
| | | Natural rubber 4 (Average particle diameter 70 mm, Mooney viscosity 100) | 80 | 0 | 0 | 0 | 0 | 0 | 0 |
| | Tackifier resin | Quinton A100 (C5 resin) | 120 | 70 | 70 | 70 | 120 | 120 | 120 |
| | | Nisseki Neopolymer 120 (C9 resin) | 0 | 40 | 0 | 0 | 0 | 0 | 0 |
| | | Quinton D200 (C5C9 resin) | 0 | 0 | 40 | 0 | 0 | 0 | 0 |
| | | YS polystar T100 (terpene phenol resin) | 0 | 0 | 0 | 40 | 0 | 0 | 0 |
| | Softener | Process oil | 40 | 40 | 40 | 40 | 40 | 40 | 40 |
| | Additives | Calcium carbonate | 40 | 40 | 40 | 40 | 40 | 40 | 40 |
| | | Anti-aging agent | 1 | 1 | 1 | 1 | 1 | 1 | 1 |
| Production conditions of pressure-sensitive adhesive layer | | Kneading temperature (° C.) | 200 | 150 | 150 | 150 | 200 | 200 | 150 |
| | | Shear rate (1/second) | 170 | 28 | 28 | 28 | 28 | 282 | 28 |
| | | Kneading time (seconds) | 60 | 360 | 360 | 360 | 360 | 36 | 360 |
| | | Rubber component feed position | # 22 | # 22 | # 22 | # 22 | # 22 | # 22 | # 22 |
| | | Petroleum resin feed position | # 23 | # 23 | # 23 | # 23 | # 23 | # 23 | # 23 |
| | | Calcium carbonate feed position | # 23 | # 23 | # 23 | # 23 | # 23 | # 23 | # 23 |
| | | Anti-aging agent feed position | # 23 | # 23 | # 23 | # 23 | # 23 | # 23 | # 23 |
| | | Process oil feed position | # 24 | # 24 | # 24 | # 24 | # 24 | # 24 | # 24 |
| Evaluation | | Biobased content (%) | 34 | 34 | 34 | 51 | 40 | 40 | 34 |
| | | Amount of unmelted materials | 0.30 | 0.10 | 0.10 | 0.10 | 0.30 | 0.10 | 0.00 |
| | | Residual solvent (ppm) | 1 | 1 | 1 | 1 | 1 | 1 | 1 |
| | | SP adhesive force (N/24 mm) | 6 | 10 | 9 | 9 | 6 | 4 | 4 |
| | | Ball tack value | 15 | 14 | 16 | 15 | 12 | 15 | 14 |
| | | Corrugated cardboard packing performance | B | AA | AA | AA | B | B | B |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Pressure-sensitive adhesive layer (parts by mass) | Rubber component | Styrene-isoprene-styrene block copolymer | 20 | 20 | 20 | 20 | 20 | 20 |
| | | Natural rubber 1 (Average particle diameter 20 mm, Mooney viscosity 100) | 80 | 80 | 80 | 80 | 0 | 0 |
| | | Natural rubber 2 (Average particle diameter 20 mm, Mooney viscosity 40) | 0 | 0 | 0 | 0 | 0 | 0 |
| | | Natural rubber 3 (Average particle diameter 20 mm, Mooney viscosity 30) | 0 | 0 | 0 | 0 | 0 | 0 |
| | | Natural rubber 4 (Average particle diameter 70 mm, Mooney viscosity 100) | 0 | 0 | 0 | 0 | 80 | 80 |
| | Tackifier resin | Quinton A100 (C5 resin) | 120 | 120 | 120 | 120 | 120 | 120 |
| | Softener | Process oil | 40 | 40 | 40 | 40 | 40 | 40 |
| | Additives | Calcium carbonate | 40 | 40 | 40 | 40 | 40 | 40 |
| | | Anti-aging agent | 1 | 1 | 1 | 1 | 1 | 1 |
| Production conditions of pressure-sensitive adhesive layer | | Kneading temperature (° C.) | 150 | 150 | 80 | 220 | 200 | 200 |
| | | Shear rate (1/second) | 14 | 370 | 28 | 28 | 28 | 370 |
| | | Kneading time (seconds) | 720 | 28 | 360 | 360 | 360 | 28 |
| | | Rubber component feed position | # 22 | # 22 | # 22 | # 22 | # 22 | # 22 |
| | | Petroleum resin feed position | # 23 | # 23 | # 23 | # 23 | # 23 | # 23 |
| | | Calcium carbonate feed position | # 23 | # 23 | # 23 | # 23 | # 23 | # 23 |
| | | Anti-aging agent feed position | # 23 | # 23 | # 23 | # 23 | # 23 | # 23 |
| | | Process oil feed position | # 24 | # 24 | # 24 | # 24 | # 24 | # 24 |
| Evaluation | | Biobased content (%) | 34 | 34 | 34 | 34 | 34 | 34 |
| | | Amount of unmelted materials | 0.10 | 0.00 | 0.70 | 0.00 | 0.70 | 0.00 |
| | | Residual solvent (ppm) | 1 | 1 | 1 | 1 | 1 | 1 |
| | | SP adhesive force (N/24 mm) | 3.5 | 3 | 14 | 3.5 | 11 | 3 |
| | | Ball tack value | 23 | 22 | 6 | 20 | 4 | 22 |
| | | Corrugated cardboard packing performance | C | C | C | C | C | C |

| | | | Comparative Example 7 | Comparative Example 8 | Comparative Example 9 | Comparative Example 10 | Comparative Example 11 |
|---|---|---|---|---|---|---|---|
| Pressure-sensitive adhesive layer (parts by mass) | Rubber component | Styrene-isoprene-styrene block copolymer | 20 | 20 | 20 | 20 | 60 |
| | | Natural rubber 1 (Average particle diameter 20 mm, Mooney viscosity 100) | 80 | 80 | 80 | 80 | 40 |
| | | Natural rubber 2 (Average particle diameter 20 mm, Mooney viscosity 40) | 0 | 0 | 0 | 0 | 0 |
| | | Natural rubber 3 (Average particle diameter 20 mm, Mooney viscosity 30) | 0 | 0 | 0 | 0 | 0 |
| | | Natural rubber 4 (Average particle diameter 70 mm, Mooney viscosity 100) | 0 | 0 | 0 | 0 | 0 |
| | Tackifier resin | Quinton A100 (C5 resin) | 120 | 120 | 120 | 120 | 120 |
| | Softener | Process oil | 40 | 40 | 40 | 40 | 40 |
| | Additives | Calcium carbonate | 40 | 40 | 40 | 40 | 40 |
| | | Anti-aging agent | 1 | 1 | 1 | 1 | 1 |
| Production conditions of pressure-sensitive adhesive layer | | Kneading temperature (° C.) | 200 | 200 | 200 | 200 | 200 |
| | | Shear rate (1/second) | 370 | 370 | 370 | 0.1 | 0.1 |
| | | Kneading time (seconds) | 28 | 28 | 28 | 10000 | 10000 |
| | | Rubber component feed position | # 22 | # 22 | # 22 | — | — |
| | | Petroleum resin feed position | # 22 | # 22 | # 23 | — | — |
| | | Calcium carbonate feed position | # 22 | # 22 | # 23 | — | — |
| | | Anti-aging agent feed position | # 22 | # 22 | # 23 | — | — |
| | | Process oil feed position | # 22 | # 24 | # 22 | — | — |
| Evaluation | | Biobased content (%) | 34 | 34 | 34 | 34 | 17 |
| | | Amount of unmelted materials | 1.00 | 0.40 | 0.40 | 3.00 | 3.00 |
| | | Residual solvent (ppm) | 1 | 1 | 1 | 1 | 1 |
| | | SP adhesive force (N/24 mm) | 2.5 | 2.5 | 2.5 | 1.5 | 1.5 |
| | | Ball tack value | 22 | 22 | 22 | 22 | 22 |
| | | Corrugated cardboard packing performance | C | C | C | C | C |

The pressure-sensitive adhesive tape of each example that satisfied the requirements of the present invention had a low environmental impact due to its high biobased content and was excellent in packing performance.

On the other hand, the pressure-sensitive adhesive tape of each comparative example had a low environmental impact, but was inferior in packing performance.

REFERENCE SIGNS LIST

10 pressure-sensitive adhesive tape
11 base material
12 paper base material
13 resin layer
14 release agent layer
15 pressure-sensitive adhesive layer
20 extruder
21 barrel
22 first raw material feed port
23 second raw material feed port
24 third raw material feed port
25 screw
26 die

The invention claimed is:

1. A pressure-sensitive adhesive tape comprising a paper base material and a pressure-sensitive adhesive layer provided on a surface of the paper base material, the pressure-sensitive adhesive layer comprising a rubber component comprising natural rubber, the pressure-sensitive adhesive layer having a biobased content of 15% or more, SP adhesive force of 4 N/24 mm or more, and a ball tack value of 8 or more, wherein an amount of a residual solvent in the pressure-sensitive adhesive layer is less than 10 ppm, wherein an amount of unmelted materials, which is a value obtained by dividing the number of the unmelted materials of the rubber component having a long diameter of 100 μm or more observed per a 50 mm square in the pressure-sensitive adhesive layer by a thickness (μm) of the pressure-sensitive adhesive layer, is 0.1 or less, and wherein a content of the natural rubber in the rubber component is 90 parts by mass or less when a total amount of the rubber component is 100 parts by mass.

2. The pressure-sensitive adhesive tape according to claim 1, wherein Mooney viscosity ($ML_{1+4}$) of the natural rubber is 20 to 120.

3. The pressure-sensitive adhesive tape according to claim 1, wherein the paper base material is kraft paper.

* * * * *